United States Patent
Chen et al.

(10) Patent No.: US 7,395,177 B2
(45) Date of Patent: Jul. 1, 2008

(54) METHOD FOR MONITORING TIRE PRESSURE VARIATION OF AUTOMOBILE TIRE AND SYSTEM FOR REALIZING THE SAME

(75) Inventors: Haosheng Chen, GuangDong (CN);
Youcong Zhu, Guang Dong Province (CN)

(73) Assignee: Shantou Hi-Tech Zone Tonki Motorcar Science and Technology Co., Ltd., Guang Dong (CN)

( * ) Notice: Subject to any disclaimer, the term of this patent is extended or adjusted under 35 U.S.C. 154(b) by 100 days.

(21) Appl. No.: 11/396,767

(22) Filed: Apr. 3, 2006

(65) Prior Publication Data

US 2006/0178853 A1 Aug. 10, 2006

Related U.S. Application Data

(63) Continuation-in-part of application No. 10/940,482, filed on Sep. 14, 2004, now abandoned.

(51) Int. Cl.
*G06F 13/10* (2006.01)
(52) U.S. Cl. ............... 702/138; 702/142; 702/145; 702/148
(58) Field of Classification Search ............ 702/104, 702/113, 140, 148, 182–185, 138, 142, 145; 340/444; 345/30; 701/70
See application file for complete search history.

(56) References Cited

U.S. PATENT DOCUMENTS

| | | | | |
|---|---|---|---|---|
| 5,218,862 | A | 6/1993 | Hurrell et al. | 73/146.5 |
| 5,343,741 | A * | 9/1994 | Nishihara et al. | 73/146.2 |
| 6,137,400 | A * | 10/2000 | Yanase et al. | 340/442 |
| 2002/0036567 | A1 * | 3/2002 | Larson | 340/442 |

* cited by examiner

*Primary Examiner*—Patrick Assouad
*Assistant Examiner*—Felix Suarez
(74) *Attorney, Agent, or Firm*—Westman, Champlin & Kelly, P.A.

(57) ABSTRACT

A method for monitoring tire pressure variation of automobile tires and a system of implementing thereof, which measures and obtains rotation speeds of individual automobile tires as reference values, and compares these reference values with the current rotation speeds of individual automobile tires to inspect tire pressure variation of automobile tires and provide basis for determining fault tire locations. Compared with the conventional art, it has advantages to determine fault locations accurately, and deal with the problem of misreporting tire locations due to the influence in determining fault locations by the difference of specifications of tires, pressure or wearing degrees. In addition, the method and system can raise an alarm when two tires arranged axially or diagonally are in case of equal underpressure, and record data relating to the alarm signal and rotation speeds as the basis for distinguishing liabilities in case of accidents.

19 Claims, 9 Drawing Sheets

METHOD FOR MONITORING TIRE PRESSURE VARIATION OF AUTOMOBILE TIRE AND SYSTEM FOR REALIZING THE SAME

The present invention claims the benefit of the U.S. patent application Ser. No. 10/940,482, which is hereby incorporated by reference for all purposes as if fully set forth herein.

FIELD OF THE PRESENT INVENTION

The present invention relates to a method and a system for detecting indirectly the tire pressure variations of automobile tire, more particularly, to a detection method and system for judging the tire pressure variation by detecting rotation turns of the wheels, calculating rotation speeds of the wheels, comparing and analyzing these rotation speeds.

DESCRIPTION OF THE RELATED ART

In prior art, pressure sensors are generally installed on the tires for measuring tire pressure of running vehicles and sending overpressure and underpressure alarms according to the measured tire pressure. The main disadvantage of this direct measurement-type device is that the tire pressure variations are large at different speeds, thus resulting in such problems that the critical value for tire pressure alarm is difficult to set and facile error alarm may be raised. In addition, such device generally transfers signals in a mode of radio transmission and receiving, and this is easy to be effected by electromagnetic wave and magnetic field.

Theoretically, the tire pressure variations will cause changes in the effective radius of the tires and thus cause different rotation speeds of the tires. Therefore, the tire pressure variations can be forecasted by detecting the variations in the tire rotation speed and alarms are raised in case of overpressure or underpressure. Such indirect measurement mode can, with using different rotation speeds at different speeds as its basis for judging overpressure or underpressure of the tires, solve the problem of facile error alarm occurring in the direct measurement mode.

In fact, however, the effective radius of individual tires of the motor vehicles are generally different form each other due to not only different brands but also different wearing degrees, and thus resulting in different rotation turns of individual tires at the same speed. Therefore, there is still problem such as low accuracy of alarm in the method or system that establishes corresponding standards only in accordance with specifications of the tires so as to suit different conditions for comparison and judgment. In addition, such method and system cannot determine the tire pressure variations when the vehicle is turning and are also difficult to judge location of the fault tire properly.

SUMMARY OF INVENTION

An object of the present invention is to provide a monitoring method with high alarm accuracy, which can perform data sampling in accordance with current concrete conditions of individual tires of the vehicle so as to establish a set of rotation speed data of the individual tires, compare these data with the real-time measured or measured and calculated rotation speeds of individual tires, forecast the tire pressure variations and raise alarms in case of overpressure or underpressure.

Another object of the present invention is to provide a method for monitoring tire pressure variation of automobile tire and system for realizing the same, which can be used in various kinds of vehicles, so as to determine locations of individual tires in case of underpressure.

An another object of the present invention is to provide a method by which the overpressure or underpressure of the tire can be monitored when the vehicle is turning. A further object of the present invention is to provide a monitoring method for determining and displaying correct location of a tire in case of the overpressure or underpressure when an alarm is raised.

A further object of the present invention is to provide a monitoring system with high alarm accuracy, which can perform data sampling in accordance with current concrete conditions of individual tires of a vehicle so as to establish a set of rotation speed data of individual tires, compare these data with the real-time measured or measured and calculated rotation speeds of individual tires, forecast the tire pressure variation and raise alarms in case of overpressure or underpressure.

Furthermore, the invention provides a system for monitoring the tire pressure variations, which can perform forecast and raise alarms when two tires arranged coaxially or diagonally are in case of equal underpressure.

A further object of the present invention is to provide a system by which the overpressure or underpressure of the tire can be monitored when the vehicle is turning.

A further object of the present invention is to provide a monitoring system for determining and displaying correct location of the tire in case of the overpressure or underpressure when an alarm is raised.

The objects can be achieved by providing a method for monitoring tire pressure variations of automobile tire, characterized in, (1) obtaining rotation speeds of individual automobile tires, and creating rotation speed reference values Vr for comparison and judgment based on the obtained rotation speeds;

(2) obtaining current rotation speeds of individual automobile tires, and calculating:

Reference rotation speed difference $Vd=|(Vtlf-Vtrf)-(Vtlb-Vtrb)|$;

Measured and calculated rotation speed difference $Vc=|(Vclf-Vcrf)-(Vclb-Vcrb)|$; And, Regarding $Vres=|Vd-Vc|$ as the compared result;

Wherein, Vtlf, Vtrf, Vtlb and Vtrb represent the teaching values of the measured rotation speeds of the left front tire, the right front tire, the left rear tire and the right rear tire, respectively, and Vclf, Vcrf, Vclb and Vcrb represent the current measured rotation speeds of the left front tire, the right front tire, the left rear tire and the right rear tire, respectively;

(3) judging the compared result Vres and raising alarms if the compared result Vres exceeds a preset value; or else turning to step (2).

Thus, the invention provides a method for creating a mode by which locations of fault running tires can be determined based on the teaching values of the measured rotation speeds regarding as reference values. Because the reference value represent synthetically the specification, pressure and wearing degrees of tires, the judging mode can be practiced widely.

The rotation speed reference values Vr mentioned in the step (1) do not change any longer after being obtained at the beginning unless they are obtained by restarting, and the step (2) can be considered as the first step when the inspection is carried out every time; said rotation speeds can be obtained directly by sensors, and also calculated through measurement of rotating turns and time; the comparison can be made by the difference method or the proportional method; the preset value can be reckoned and may be obtained through tests with higher accuracy.

In above method, the compared result Vres in the step (3) is confirmed and considered to raise an alarm only when it exceeds the preset value continuously many times.

Said word 'continuously' means that the comparison is carried out between adjacently measured or calculated rotation speeds. And the comparison may be referred as comparing corresponding rotation speeds or formulas including individual rotation speeds. This method can avoid malfunction problems caused by sudden and large variation in the resultant data in such special cases such as bumpy road during traveling.

In above method, for the rotation speeds mentioned in the steps (1) and (2), the braking case or the tire's turns measured during braking and the spent time must be excluded.

In step (1) of above method, the reference rotation speed of individual tire is determined by a method for determining reference data.

In above method, the following data will be calculated when an alarm is raised in the step (3):

Left difference reference of rotation speed Vrld=Vtlf−Vtlb;

Right difference reference of rotation speed Vrrd=Vtrf−Vtrb;

Left difference of measured and calculated rotation speed Vcld=Vclf−Vclb:

Right difference of measured and calculated rotation speed Vcrd=Vcrf−Vcrb; And;

Comparing |Vrld−Vcld| with |Vrrd−Vcrd|:

If |Vrld−Vcld|>|Vrrd−Vcrd|, then further comparing Vclf with Vclb;
  If Vclf>Vclb, it is indicated that a fault occurs in the left front tire;
  if Vclf<Vclb, it is indicated that a fault occurs in the left rear tire;

If |Vrld−Vcld|<|Vrrd−Vcrd|, then further comparing Vcrf with Vcrb;
  If Vcrf>Vcrb, it is indicated that a fault occurs in the right front tire;
  If Vcrf<Vcrb, it is indicated that a fault occurs in the right rear tire.

According to anther aspect of the invention, when alarm is raised in step (3) of the above method, a calculating step (4) for calculating following data is further composed of: Left difference reference of rotation speed: Vrld=Vtlf−Vtlb;

Right difference reference of rotation speed: Vrrd=Vtrf−Vtrb;

Left difference of measured and calculated rotation speed Vcld=Vclf−Vclb:

Right difference of measured and calculated rotation speed Vcrd=Vcrf−Vcrb; And;

Comparing |Vrld−Vcld| with |Vrrd−Vcrd|, wherein:

If |Vrld−Vcld|>|Vrrd−Vcrd|, then further judging whether Vcld>Vrld is true, if true, it is indicated that a fault occurs in the left front tire; or else, it is indicated that a fault occurs in the left rear tire;

If |Vrld−Vcld|<|Vrrd−Vcrd|, then further judging whether Vcrd>Vrrd is true, if true, it is indicated that a fault occurs in the right front tire; or else, it is indicated that a fault occurs in the right rear tire.

Furthermore, in the calculating step(4), if |Vrld−Vcld|=|Vrrd−Vcrd|, then further judging whether Vres>preset value×2 is true;

If true, then further comparing and judging whether Vrld<Vcld is true, if true, it is indicated that faults occur in the left front tire and the right rear tire: or else, it is indicated that faults occur in the right front tire and the left rear tire. This method provides theory to further analyze the situation of tires on both sides, particularly to analyze the situation of tires arranged diagonally in case of equal underpressure.

If Vres>preset value×2 is false, then performing the following comparison and determination:

If both |Vclf−Vtlf|>preset value×2 and |Vcrf−Vtrf|>preset value×2 are true, then it is indicated that faults occur in the left front tire and the right front tire; If both |Vclb−Vtlb|>preset value×2 and |Vcrb−Vtrb|>preset value×2 are true, it is indicated that faults occur in the left rear tire and the right rear tire. This method provides theory to further analyze the situation of tires on both sides, particularly to analyze the situation of tires arranged axially in case of equal underpressure.

More preferably, the method mentioned above turns to step (2) while indicating the faults, and records the rotation speeds of individual tires with respect to time. When tire faults occur, the method further records alarm signal, tire location, times of faults, and correction condition The invention also provides a system for monitoring tire pressure variation of automobile tire, comprising a tire signal interface circuit for obtaining rotation signal of vehicle tires and converting the same; a braking signal converting circuit for obtaining braking signal of the vehicle and converting the same; a key-press input circuit; a single chip microprocessor, which performs processing in accordance with signals provided by the tire signal interface circuit, the braking signal converting circuit and the key-press input circuit; a display screen interface circuit or a buzzer driving circuit, which sends concerned information to the display screen or the buzzer based on processing results of the single chip microprocessor, wherein the single chip microprocessor performs process in accordance with flowing procedures:

(1) obtaining rotation speeds of individual automobile tires, and creating rotation speed reference values for comparison and judgment based on the obtained rotation speeds;

(2) obtaining current rotation speeds of individual automobile tires, and calculating:

Reference rotation speed difference Vd=|(Vtlf−Vtrf)−(Vtlb−Vtrb)|;

Measured and calculated rotation speed difference Vc=|(Vclf−Vcrf)−(Vclb−Vcrb)|; and, Regarding Vres=|=Vd−Vc| as the compared result;

Wherein, Vtlf, Vtrf, Vtlb and Vtrb represent the teaching values of the measured rotation speeds of the left front tire, the right front tire, the left rear tire and the right rear tire, respectively, and Vclf, Vcrf, Vclb and Vcrb represent the current measured rotation speeds of the left front tire, the right front tire, the left rear tire and the right rear tire, respectively;

(3) judging the compared result Vres and raising alarms if the compared result Vres exceeds a preset value; or else turning to step (2).

Said rotation speeds can be obtained directly by sensors, or calculated through measurement of rotating turns and time; the comparison can be made by the difference method or the proportional method; the preset value can be reckoned and may be obtained through tests with higher accuracy.

In above system, the compared result Vres in the processing step (3) is confirmed and considered to raise an alarm only when it exceeds the preset value continuously many times.

Said word 'continuously' means that the comparison is carried out between adjacently measured or calculated rotation speeds. And the comparison may be referred as comparing corresponding rotation speeds or formulas including individual rotation speeds.

The above system is also provided with data setting circuit, which can provide data concerning various type of vehicles to the single chip microprocessor so that the system forms preset values.

In above system, for the rotation speeds mentioned in the processing steps (1) and (2), the braking case or the tire's turns measured during braking and the spent time must be excluded.

The above system is also provided with data setting circuit.

In the processing step (1) of said monitoring system, the reference rotation speed of individual tire is determined by a method for determining reference data.

In above system, the comparison in the processing step (2) is carried out in accordance with following method:

Reference rotation speed difference Vd=|(Vtlf−Vtrf)−(Vtlb−Vtrb|;

Measured and calculated rotation speed difference Vc=|(Vclf−Vcrf)−(Vclb−Vcrb)|; And, Regarding Vres=|Vd−Vc| as the compared result;

Wherein, Vtlf, Vtrf, Vtlb and Vtrb represent the teaching values of the measured rotation speeds of the left front tire, the right front tire, the left rear tire and the right rear tire, respectively, and Vclf, Vcrf, Vclb and Vcrb represent the current measured rotation speeds of the left front tire, the right front tire, the left rear tire and the right rear tire, respectively.

In above system, the following data will be calculated if an alarm is raised in the step (3):

Left difference reference of rotation speed Vrld=Vtlf−Vtlb;

Right difference reference of rotation speed Vrrd=Vtrf−Vtrb;

Left difference of measured and calculated rotation speed Vcld=Vclf−Vclb;

Right difference of measured and calculated rotation speed Vcrd=Vcrf−Vcrb; And;

Comparing |Vrld−Vcld| with |Vrrd−Vcrd|:

If |Vrld−Vcld|>|Vrrd−Vcrd|, then further comparing Vclf with Vclb;

If Vclf>Vclb, then transmitting a signal indicating that a fault occurs in the left front tire to the display screen and the display screen interface circuit thereof;

if Vclf<Vclb, then transmitting a signal indicating that a fault occurs in the left rear tire to the display screen and the display screen interface circuit thereof;

If |Vrld−Vcld|<|Vrrd−Vcrd|, then further comparing Vcrf with Vcrb;

If Vcrf>Vcrb, then transmitting a signal indicating that a fault occurs in the right front tire to the display screen and the display screen interface circuit thereof;

If Vcrf<Vcrb, then transmitting a signal indicating that a fault occurs in the right rear tire to the display screen and the display screen interface circuit thereof.

According to another aspect of the invention, when alarm is raised in step (3) of said monitoring system, the invention further comprises a calculating step(4) for calculating following data:

Left difference reference of rotation speed Vrld=Vtlf−Vtlb;

Right difference reference of rotation speed Vrrd=Vtrf−Vtrb;

Left difference of measured and calculated rotation speed Vcld=Vclf−Vclb;

Right difference of measured and calculated rotation speed Vcrd=Vcrf−Vcrb; and;

Comparing |Vrld−Vcld| with |Vrrd−Vcrd|, wherein:

If |Vrld−Vcld|>|Vrrd−Vcrd|, then further judging whether Vcld>Vrld is true, if true, then transmitting a signal indicating that a fault occurs in the left front tire to the display screen and the display screen interface circuit thereof; or else, transmitting a signal indicating that a fault occurs in the left rear tire to the display screen and the display screen interface circuit thereof:

If |Vrld−Vcld|<|Vrrd−Vcrd|, then further judging whether Vcrd>Vrrd is true, if true, then transmitting a signal indicating that a fault occurs in the right front tire to the display screen and the display screen interface circuit thereof; or else, transmitting a signal indicating that a fault occurs in the right rear tire to the display screen and the display screen interface circuit thereof.

In the calculating step (4) of said monitoring system, if |Vrld−Vcld|=|Vrrd−Vcrd|, then further judging whether Vres>preset value×2 is true;

If true, then further comparing and judging whether Vrld<Vcld is true, if true, then transmitting a signal indicating that faults occur in the left front tire and the right rear tire to the display screen and the display screen interface circuit thereof; or else, transmitting a signal indicating that faults occur in the right front tire and the left rear tire to the display screen and the display screen interface circuit thereof. Therefore, the system has ability to recognize the situation of tires arranged diagonally in case of equal underpressure.

If Vres>preset value×2 is false, then performing the following comparison and determination:

If both |Vclf−Vtlf|>preset value×2 and |Vcrf−Vtrf|>preset value×2 are true, then transmitting a signal indicating that faults occur in the left front tire and the right front tire to the display screen and the display screen interface circuit thereof; if both |Vclb−Vtlb|>preset value×2 and |Vcrb−Vtrb|>preset value×2 are true, then transmitting a signal indicating that faults occur in the left rear tire and the right rear tire to the display screen and the display screen interface circuit thereof. Therefore the system has ability to recognize the situation of tires arranged axially in case of equal underpressure.

The monitoring system further comprises an EEPROM circuit, it turns to step (2) while indicating faults and records the rotation speeds of individual tires with respect to time. When tire faults occur, the method further records alarm signal, tire location, times of faults, and correction condition in the EEPROM circuit.

1. This method or system performs data sampling, measurement or calculation in accordance with concrete conditions of individual tires of the vehicle so as to establish a set of rotation speed data of individual tires, and compares these data with the real-time measured or calculated rotation speeds of individual tires to forecast the tire pressure variations so as to adapt to monitoring of the tire pressure variations of various types of vehicles and to be closer to actual conditions of individual tires. In such way, it solve deviation problem that results from different rotation speeds of individual tires at the same speed which are caused by different effective radius due to different brands and different wearing degree for the same specification, thus effectively improving monitoring and alarming accuracies of the method or system.

2. The compared result is confirmed only when the absolute value of the difference between measured and calculated rotation speed difference Vc obtained continuously many times and reference rotation speed difference Vd is beyond the preset value, thus avoiding malfunction problem that may be caused by sudden and large variation in the data in such special cases as bumpy road during traveling.

3. During measuring and determining rotation speed, the braking case is specially treated and the impact caused by braking is removed, resulting in ensuring accuracy of the data, no impact on further measurement of the data, shortening measurement process and improving response ability.

4. The judgment compares differences between sums of rotation speeds or references on different sides. Therefore, the tire pressure variations can still be monitored by such arithmetic when the vehicle is turning.

5. The correct location of the tires in case of overpressure or underpressure can be indicated to help the driver take corresponding emergent measures on the basis of his or her experiences so as to avoid accident as far as possible, and also help people find fault and problems as soon as possible so as to maintain and replace defective one(s).

6. This method or system also plays role in such case that two or three tires are in fault at the same time.

7. This method or system only requires obtaining rotation speeds or rotating turns and braking signals of individual tires of the vehicle, which can be obtained at the driver's location. Therefore, this method or system is of simple one and is easy and convenient to be equipped with system.

8. The method or system also predictively raises alarms when two tires arranged axially or diagonally are in case of equal underpressure, removes hidden problems, raises alarm as soon as possible, and enhances reactive capability, so as to help the driver take corresponding emergent measures on the basis of his or her experiences, thereby the method or system overcomes the problems result from comparing the data detected from the diagonal tires in conventional method and system.

9. The method or system can records tire rotation speeds with respect to time, and more particularly, when tires are in fault, the alarm signal, tire locations, fault times and correction condition are additionally recorded as basis for distinguishing liabilities of producers and users.

BRIEF DESCRIPTION OF THE DRAWINGS

The foregoing and other objects, features and advantages of the present invention will become more readily apparent from the following detailed description of the preferred embodiments of the present invention in conjunction with the accompanying drawings of which.

DESCRIPTION OF THE PREFERRED EMBODIMENTS

Figure 1:
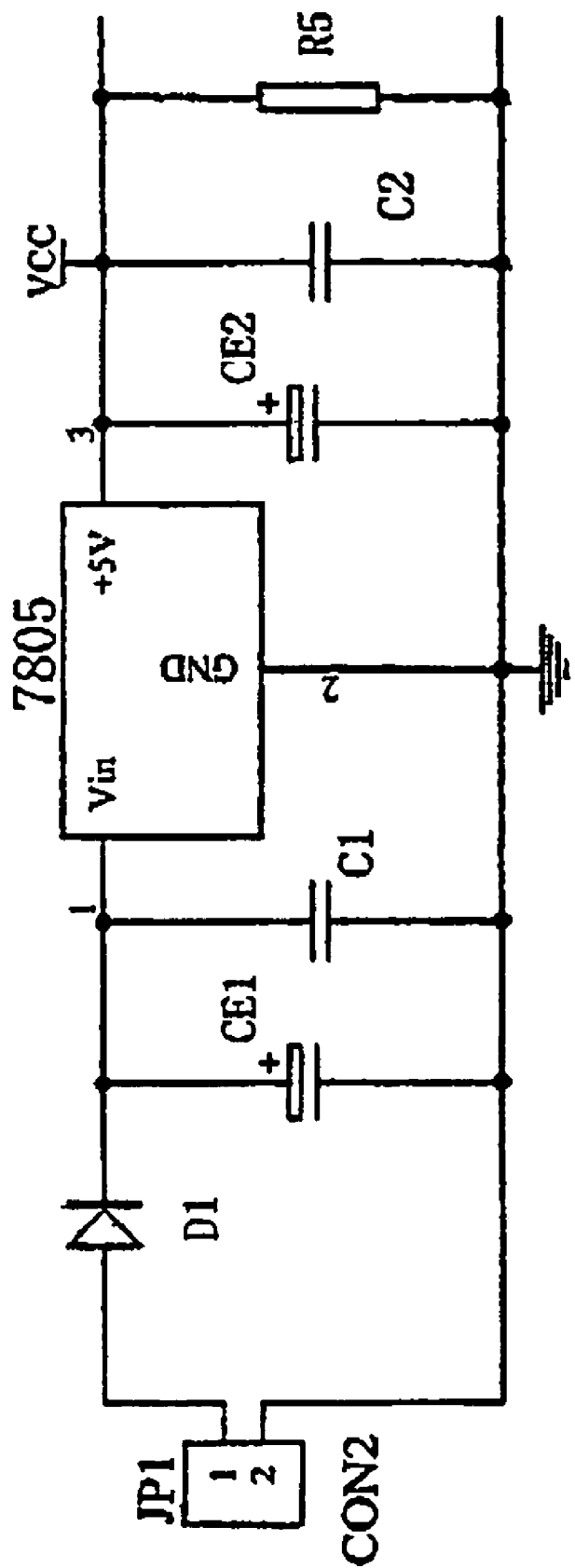
FIG. 1 indicates the power circuit of the system according to an embodiment of the present invention.

The detailed embodiment mode of the system and method according to the present invention is further explained as follows combined with the attached drawings:

The step or procedure design of the embodiment is divided into two parts, i. e., reference rotation speed difference Vd establishment part and measured and calculated rotation speed difference Vc establishment part, and there are some common procedures between these two parts, so that they can be designed as another common part that mainly comprises measurement of rotating turns of individual tires, inspection of data effectiveness and calculation of rotation speeds of individual tires, and two parts are separated each other and enter individual substantial procedure after judging the teaching mark. A reference value establishment portion comprises a process of establishment of the reference value which is regarded as the basis for determining tires in case of underpressure and the locations thereof, a reference value of rotation speed which is established based on the reference value establishment part is more accurate because the influence of occasional factors has been removed. The inspection portion comprises these processes of fault determination, fault analysis, and data record.

The establishment part of a reference value of rotation speed requires measuring and obtaining two sets of data, mainly comprising measurement of teaching values of individual tires, inspection of effectiveness of teaching values, establishment of quasi-reference value Vrq and establishment of reference data so as to determine the reference value of the rotation speed Vr, and this process is called 'teaching' that establishes reference data for comparison and judgment.

The inspection part comprises these processes of comparison of the measured and calculated rotation speed difference Vc with the reference rotation speed difference Vd, inspection of speed overlimit, fault analysis, correction analysis and alarm display, etc.

The following contents give explanation of composition and functions of individual parts.

Measurement of the rotating turns of individual tires. In this part, the rotating turns of individual tires can be obtained from the sensor provided on the motor vehicle. In general, the vehicle is possible driven at a slow speed, so that the rotation speed shall not be evaluated on the basis of instantly measured data and it is required to evaluate based on the rotating turns in a certain period. More detailed, the measurement of the rotation speed shall be made with the rotating turns in a certain period as the calculation basis, and the measuring speed depends on the time necessary for measurement.

Inspection of data effectiveness. It is necessary to inspect the effectiveness of the actually measured rotating turns of the tires. Whatever the establishment of the reference value or the inspection process it is, the data during the braking is not typical and is of no significance due to the great instant variation in the rotation speed, and so that it shall be excluded; in addition, the time during which the rotating turns are measured also must be excluded so as to ensure accuracy of the measured rotation speed. Specifically, it is necessary to judge whether there is braking currently during measuring rotating turns of the tires, and if positive, the turns and the needed time in this measurement will not be accumulated into the total turns and total time.

Calculation of rotation speeds of individual tires. The rotation speeds of individual tires will be calculated after inspection of the data effectiveness in accordance with the measured rotating turns and the needed measurement time.

Measurement of teaching values of individual tires. It is required to obtain these reference values of rotation speeds of the new tires, the substituted tires after being repaired or re-teaching of the system by calculating the rotation speeds of said individual tires. The obtained reference value of rotation speed is referred as teaching values and will be used for calculating the reference values.

Inspection of effectiveness of the teaching values. The efficiency of the measured teaching values shall be inspected and the data is effective when meeting the following conditions: the vehicle's speed is more than 20 km/hour and less than 80 km/hour, and $|Vtlf-Vtrf|\leq 0.34$ turns/s and $|Vtlb-Vtrb|\leq 0.34$ turns/s. Wherein, Vtlf, Vtrf, Vtlb and Vtrb represent the teaching values of the measured rotation speeds of the left front tire, the right front tire, the left rear tire and the right rear tire, respectively, and Vclf, Vcrf, Vclb and Vcrb represent the current measured rotation speeds of the left front tire, the right front tire, the left rear tire and the right rear tire, respectively. The vehicle's speed is $2\times\pi\times R\times N$, wherein R is the general radius of the tires, N is the rotating speed of the tire, $\pi$ is the circular constant which is preset as 3.14.

Determination of quasi-reference values Vrq. Six sets of teaching values which are proved effective through above effectiveness inspection of the teaching values are obtained (six times) and their absolute values are calculated as following respectively: $|(Vtlf-Vtrf)-(Vtlb-Vtrb)|$, and one set of the largest absolute value and one set of the smallest absolute value are discarded, and the average rotating speeds of individual tires are calculated respectively from the rest four sets of studied values as the quasi-reference values Vrq.

Determination of reference data. Based on determination of the quasi-reference value $Vrq=|(Vtlf-Vtrf-(Vtlb-Vtrb)|$, the quasi-reference value $Vrq_1$ and the quasi-reference value $Vrq_2$ are obtained. If $|Vrq_2-Vrq_1|\leq 1333\times 10^{-7}$ turns/s, these two values will be used for calculating the mean rotating speeds of individual tires as the rotation speed reference value Vr, namely, $Vr=(Vrq_1+Vrq_2)/2$; if $|Vrq_2-Vrq_1|>1333\times 10^{-7}$ turns/s, the quasi-reference value $Vrq_3$ will be determined again, and then compared with the quasi-reference value $Vrq_2$. By analogy, until $|Vrq_n-Vrq_{n-1}|\leq 1333\times 10^{-7}$ turns/s (wherein, $Vrq_n$, $Vrq_{n-1}$ are the last two quasi-reference value) and then the mean of the last two quasi-reference values $Vrq_n$, $Vrq_{n-1}$ is regarded as the rotation speed reference value Vr.

Comparing measured and calculated rotation speed difference Vc with reference rotation speed difference Vd. The measured and calculated rotation speed difference Vc and reference rotation speed difference Vd of the left front tire, the right front tire, the left backtire and the right rear tire are calculated and compared detailedly as follows:

Reference rotation speed difference $Vd=|(Vtlf-Vtrf)-(Vtlb-Vtrb)|$;

Measured and calculated rotation speed difference $Vc=|(Vclf-Vcrf)-(Vclb-Vcrb)|$; And regarding $Vres=|Vd-Vc|$ as the compared result.

If the compared result $Vres\leq 1112\times 10^{-9}$ turns/s, it is considered that the rotation speed is normal, otherwise the rotation speed is considered as being beyond the limit and there is possible fault in tires. Wherein, Vclf, Vcrf, Vclb and Vcrb represent the current measured rotation speeds of the left front tire, the right front tire, the left rear tire and the right rear tire, respectively. Such arithmetic, because uses the rotation speed of the tires on different sides for comparison, can overcome impact on the arithmetic caused by the naturally quick rotation speed of the tires on the outer side when the vehicle is turning the corner, which can be counteracted in the calculation, and thus the arithmetic is still able to play a role in monitoring the tires when the vehicle is turning the corner.

Inspection of speed over-limit. When the speed of the vehicle is less than 20 km/hour or more than 200 km/hour, it is regarded as going beyond the inspection scope and the inspection is not performed any longer, in which the vehicle's speed is $2\times\pi\times R\times N$, wherein R is the general radius of the tires, N is the rotating speed of the tire, $\pi$ is the circular constant which is preset as 3.14.

Fault analysis. The first step is to separate the left side from the right side before comparison and judgment, and then to judge which side is in the fault and then which one between the front and the rear tires is in fault, with detailed comparison and calculation as follows:

Left difference reference of rotation speed $Vrld=Vtlf-Vtlb$;

Right difference reference of rotation speed $Vrrd=Vtrf-Vtrb$;

Left difference of measured and calculated rotation speed $Vcld=Vclf-Vclb$;

Right difference of measured and calculated rotation speed $Vcrd=Vcrf-Vcrb$; And;

Comparing $|Vrld-Vcld|$ with $|Vrrd-Vcrd|$:

If $|Vrld-Vcld|>|Vrrd-Vcrd|$, then further comparing Vclf with Vclb;

If Vclf>Vclb is three times continuously, it is indicated that a fault occurs in the left front tire;

if Vclf<Vclb is three times continuously, it is indicated that a fault occurs in the left rear tire;

If $|Vrld-Vcld|<|Vrrd-Vcrd|$, then further comparing Vcrf with Vcrb;

If Vcrf>Vcrb is three times continuously, it is indicated that a fault occurs in the right front tire;

If Vcrf<Vcrb is three times continuously, it is indicated that a fault occurs in the right rear tire.

If the rotation speed is beyond the limit three times continuously, it is considered that the compared result is confirmed and fault occurs in tires, and the limit is stipulated on this basis so that the malfunction problem that may be caused by large variation in the data in such special cases as bumpy road during traveling can be avoided. It is obvious for a person skilled in the art that the limit times can be set 4, 5 or more.

Otherwise, in the case that a new car or a car having replaced tires is going into use, tires should be inspected so as to establish new reference value which will be regarded as the basis for determining tires in case of underpressure in the future. There is a problem that determination of the fault tire location which is performed merely based on the tire rotation speed obtained in real time could be used in such limited cases as equal reference values of tires arranged on same side. In practical applications, the reference values of rotation speed of individual tires of the motor vehicles are generally different form each other due to not only different specifications of same type tires but also different pressure or wearing degrees. Therefore, in many cases, the low accuracy of judgment always results in wrong report for the tire locations. Furthermore, the conventional method and system cannot raise an alarm when two tires arranged axially or diagonally are in case of equal underpressure, this hidden problem may result in accidents in some cases because no alarm is raised. In addition, data relating to the alarm signal and rotation speeds in real time are important and should be recorded as the basis for distinguishing liabilities in case of accidents.

Thus, according to a preferred embodiment of the invention, fault tires can be determined as follows:

Left difference reference of rotation speed $Vrld=Vtlf-Vtlb$;

Right difference reference of rotation speed $Vrrd=Vtrf-Vtrb$;

Left difference of measured and calculated rotation speed $Vcld=Vclf-Vclb$;

Right difference of measured and calculated rotation speed $Vcrd=Vcrf-Vcrb$; And;

Comparing $|Vrld-Vcld|$ with $|Vrrd-Vcrd|$, wherein:

If $|Vrld-Vcld|>|Vrrd-Vcrd|$, then further judging whether Vcld>Vrld is true, if true, it is indicated that a fault occurs in the left front tire; or else, it is indicated that a fault occurs in the left rear tire;

If |Vrld−Vcld|<|Vrrd−Vcrd|, then further judging whether Vcrd>Vrrd is true, if true, it is indicated that a fault occurs in the right front tire; or else, it is indicated that a fault occurs in the right rear tire.

Furthermore, if |Vrld−Vcld|=|Vrrd−Vcrd|, then further judging whether Vres >preset value×2 is true;

If true, then further comparing and judging whether Vrld<Vcld is true, if true, it is indicated that faults occur in the left front tire and the right rear tire; or else, it is indicated that faults occur in the right front tire and the left rear tire. Thus this system has the capacity to recognize the situation of tires arranged diagonally in case of equal underpressure.

If Vres>preset value×2 is false, then performing the following comparison and determination:

If both |Vclf×Vtlf|>preset value×2 and |Vcrf−Vtrf|>preset value×2 are true, then it is indicated that faults occur in the left front tire and the right front tire;

If both |Vclb−Vtlb|>preset value×2and |Vcrb−Vtrb|>preset value×2 are true, it is indicated that faults occur in the left rear tire and the right rear tire. Thus, this system has the capacity to recognize the situation of tires arranged axially in case of equal underpressure.

The system records the rotation speeds of individual tires with respect to time while indicating faults, and when tire faults occur, the system further records alarm signal tire location, times of faults, and correction condition.

The above-mentioned word 'continuously' means that the comparison is carried out between corresponding adjacently measured or calculated speeds.

Correction analysis. The system will perform automatic analysis after replacement of the tire in the case of fault, and the alarm mark will be cleared if the compared result is not more than the preset value three times continuously.

Alarm display. In the case of fault, i. e., there is a fault mark, a sound alarm will be raised and the fault location of the tire will be displayed to inform the user.

For the embodiment mode provided by the present invention, its method and system procedures can be organized into the following flow chart in accordance with above compositions:

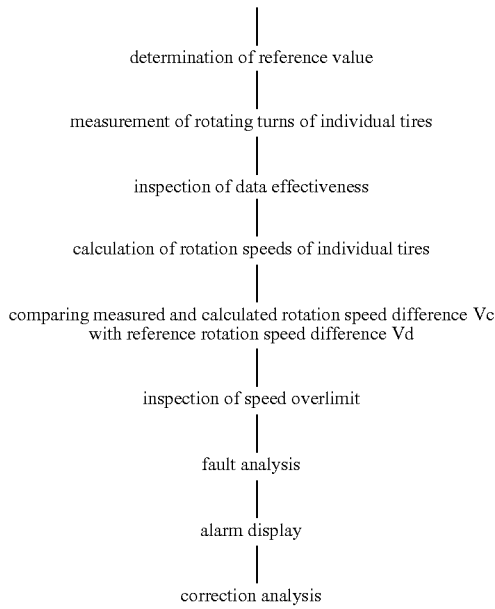

The embodiments of the present invention are given as follows and relates to the Honda car with the tire's diameter (2 R) of 63 cm.

In the reference FIG. 1, the circuit is used for supplying DC power to the system and adopts a voltage regulator circuit 7805 with three terminals, in which a connector JP1 is connected to DC 9V-18V on the vehicle and the power is transformed into VCC (DC5V) voltage after filtered and stabilized. Diode D1 is used for preventing the input voltage from polarity inversion; R5 is a discharge resistor, by which the residual power on the electrolytic capacitor and other elements is discharged after power interruption in the circuit.

Figure 2:
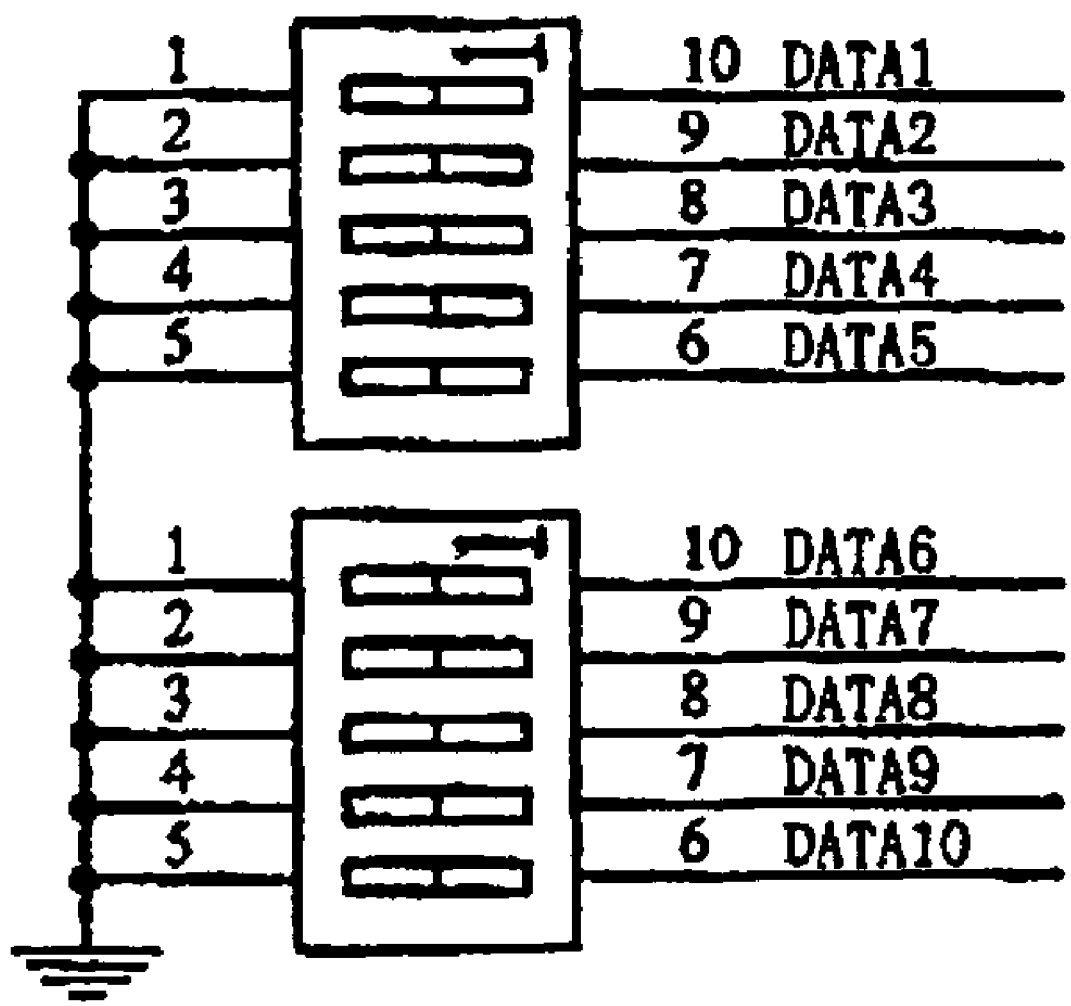
FIG. 2 indicates the data setting circuit of the system according to an embodiment of the present invention.

In the reference FIG. 2, which shows the data setting circuit of the system, the circuit is used for manual setting data in the single chip microprocessor, and also for adjusting 10-digit DIP switch of DIP10 in accordance with different models of the cars and different control requirements, so as to modulate the preset value to $4666 \times 10^{-5}$ turns/second+n×$1333 \times 10^{-7}$ turns/second, wherein n is the value set in the data setting circuit DIP1O. The data of this embodiment is set on the basis of the variation of the effective radius of the tire after 1 bar air pressure is released under the normal tire pressure, and the default value of the system is 6 mm; the setting value of the DIP switch equals 2 if the actual variation is 8 mm; the setting value of the DIP switch equals −1 if the actual variation is 5 mm; in another word, the value of the DIP is set in accordance with the difference after comparison of the actual variation with the default value.

Figure 3:
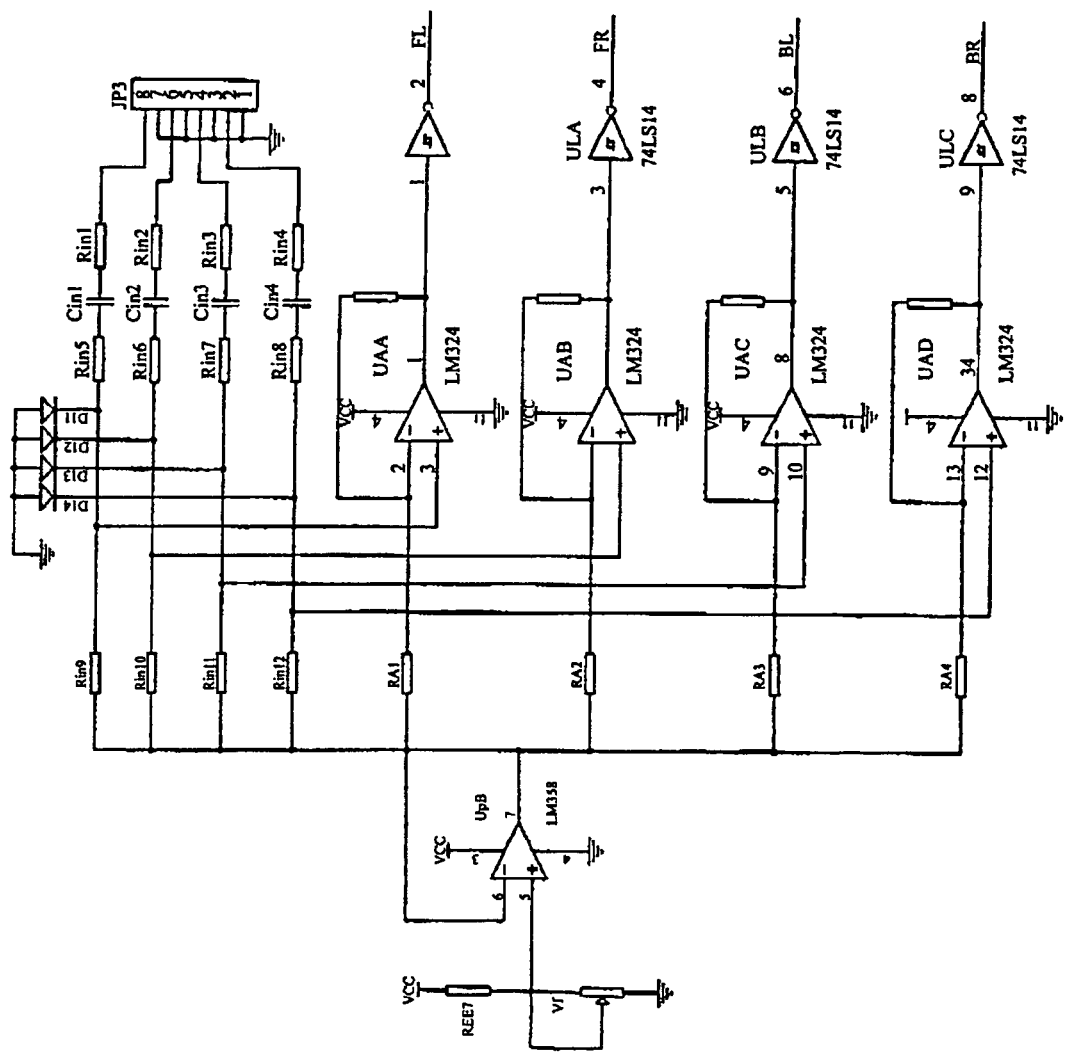
FIG. 3 indicates the tire signal interface circuit of the system according to an embodiment of the present invention.

In the reference FIG. 3, which shows the tyre signal interface circuit of the system, the circuit is used for obtaining signals of four wheels by velocity sensors and amplifying and transforming them into square wave signals. Particularly, the velocity sensors are electromagnetic or Hall sensors, the connector JP3 is connected to the velocity sensors; the signals, whose DC sections are isolated by the capacitances Clin1, Clin2, Clin3 and Cin4, are amplified via operation amplifiers Uaa, Uab, Uac and Uad, and shaped and filtered through six inverted schmitt triggers 74LS 14, and then transformed into the square wave impulse signals FL, FR, BL and BR of 0-5V, which are connected to single chip microprocessor AT89S52, and Upb makes the Upb output voltage within the threshold of six inverted Schmitt triggers 74LS 14 through VF regulation. In addition, the abnormal situation resulted by strong AC signals could be avoided by filtering through diodes D11, D12,D13,D14. In FIG. 3, LM358 is a double op amplifier.

Figure 4:
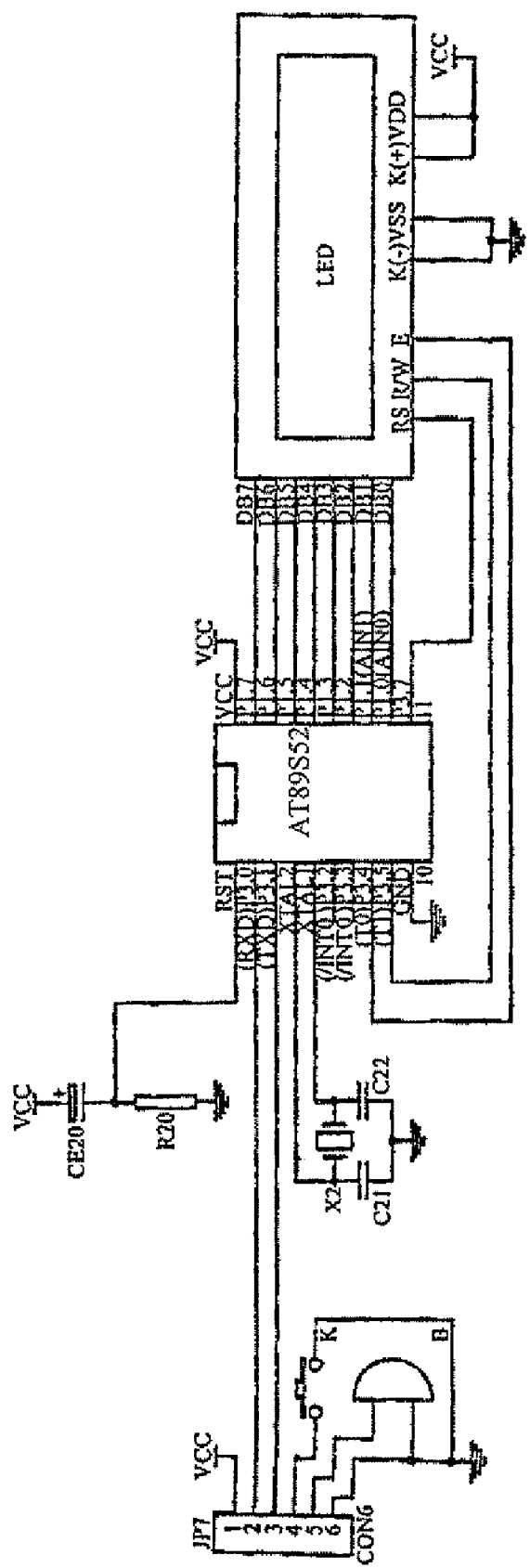
FIG. 4 indicates the display screen and its interface circuit of the system according to an embodiment of the present invention.
Figure 8:
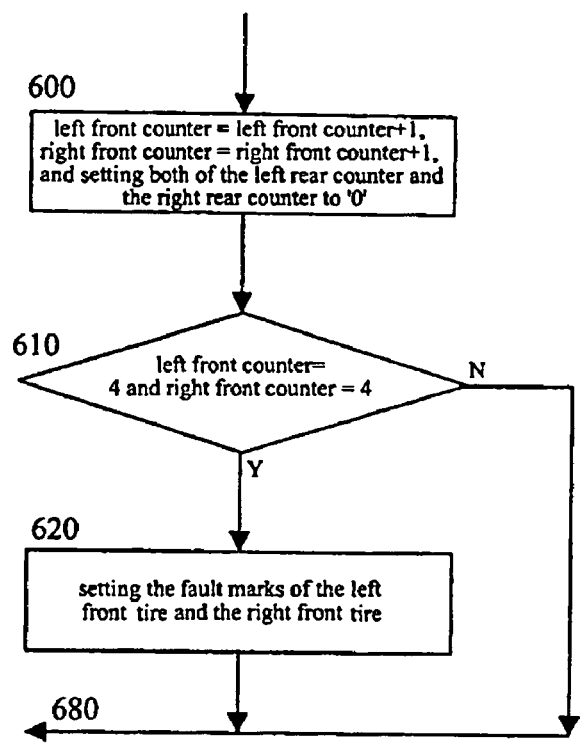
FIG. 8 is a block diagram of fault analysis 2 of the embodiment shown in FIG. 6.
Figure 9:
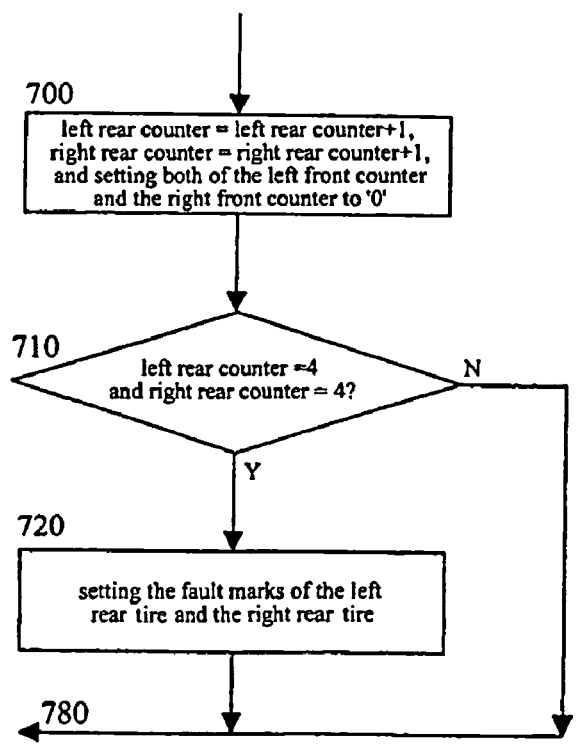
FIG. 9 is a block diagram of fault analysis 3 of the embodiment shown in FIG. 6.

In the reference FIG. 4, the circuit is a central process part, whose connector JP4 is connected to connector JP7 in FIG. 8, in which P1.2 is used for inspecting whether the key in FIG. 8 is operated and constituting a key and an interface circuit thereof together with the key K; P1.3 controls a buzzer B shown in FIG. 4 via a transistor T1 to make a sound, and is used for controlling outside buzzer that gives out no sound for high level and gives out sound for low level; AT89S52 is connected to the processed signals FL, FR, BL and BR of four tires; the connector JP2 is connected to the braking signal, and thus the status variation of P1.4 of AT89S52 can be determined immediately and outer interference to AT89S52 can be avoided through a PCX photoelectric coupler; P3.0 and P3.1 of AT89S52 can output different photoelectric effects for use in accordance with different outside unit (JP5 or JP7) connected to JP4; in addition, RST is connected to the reset pin RESET of X5045 which is a programmable UP monitor manufactured by, for example, XICOR Company, and can reset AT89S52 in the case of power supplying and also low voltage of the circuit; P3.4, P3.5, P3.6 and P3.7 are connected to X5045 that supplies reset signal to AT89S52 and also can save the data into X5045 so that the data would not be lost during powering off and X5045 can function as a watchdog when the program of AT89S52 is in malfunction. The circuit further comprises a real-time clock circuit DS1302 with high performance and low power dissipation and a large capacity EEPROM chip AT24C256, which are connected to the single chip microprocessor AT89S52 through three lines, and used for providing specific timing and storing data so as to keep on timing and storing data even in case of power off or breaking.

Figure 5:
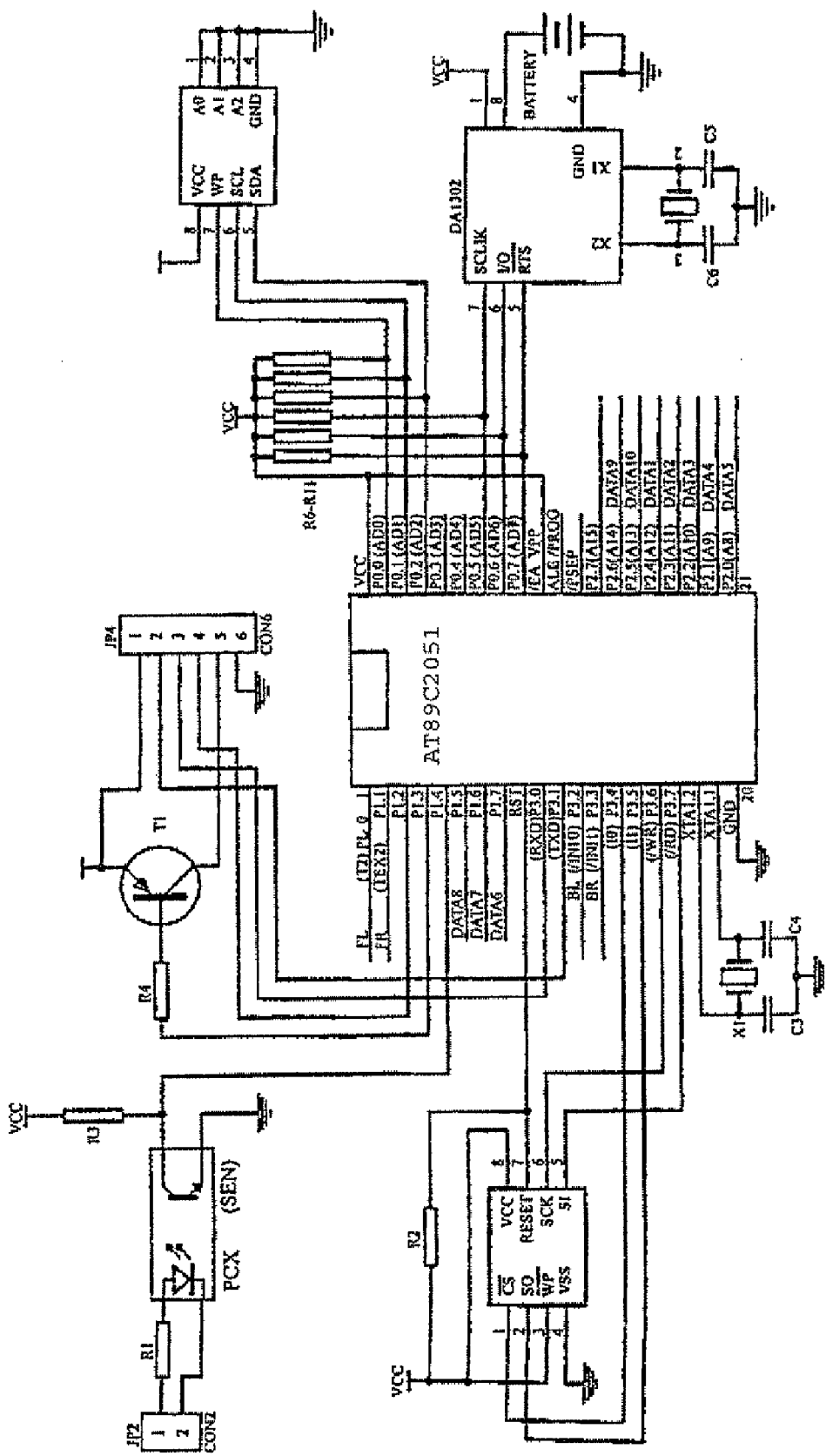
FIG. 5 indicates the single chip microprocessor of the system according to an embodiment of the present invention.
Figure 6A:
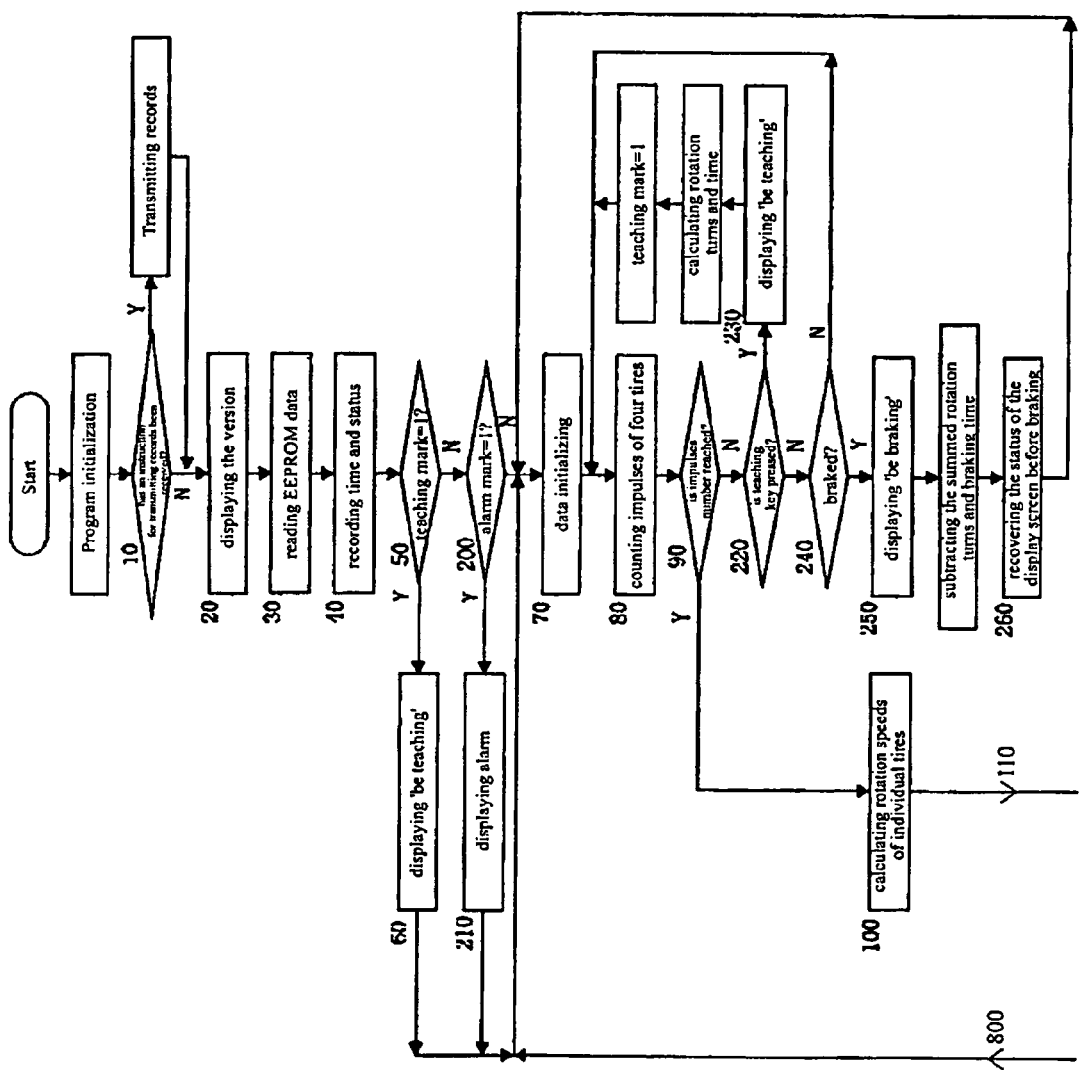
FIGS. 6a and 6b are a block diagram of method procedures and system software of the embodiment according to the present invention.
Figure 6B:
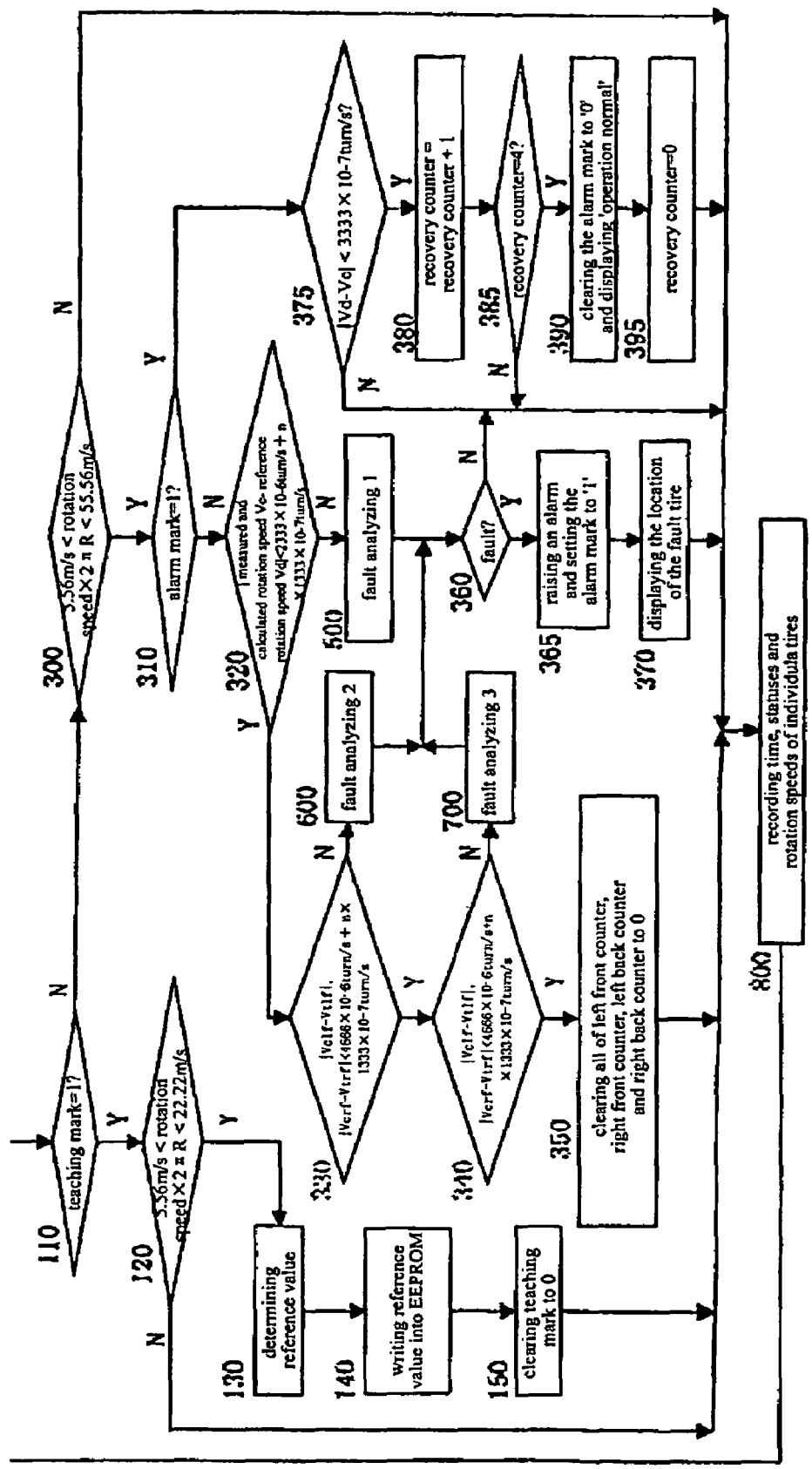
Figure 7:
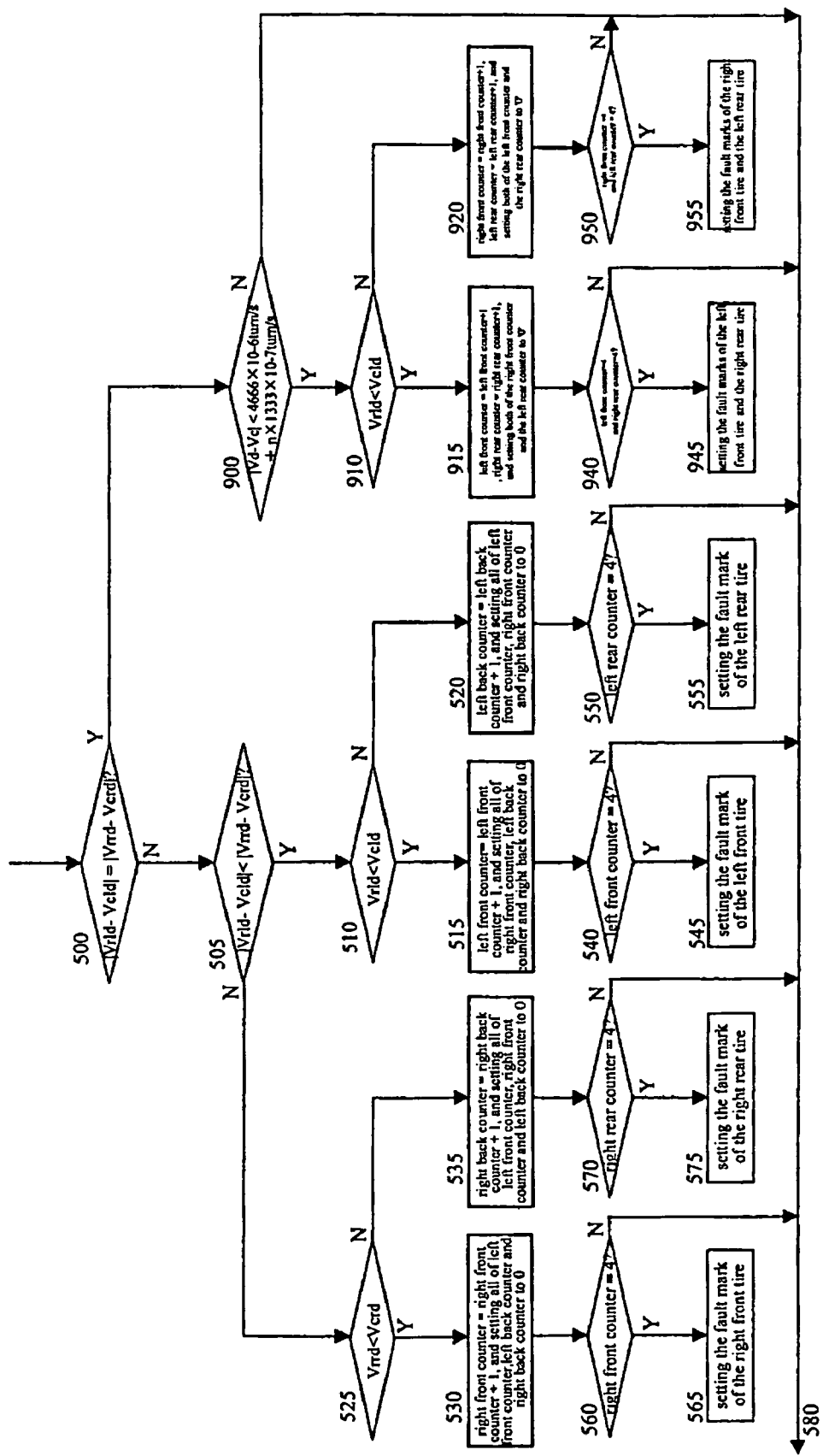
FIG. 7 is a block diagram of fault analysis 1 of the embodiment shown in FIG. 6.

In the reference FIG. 5, the circuit comprises a key-press input circuit, a buzzer output circuit B, a key K, a LCD display P-G14B32CP and its interface circuit; the connector JP7 is connected to the connector JP4 shown in FIG. 4; PIN1 and PIN6 are VCC and GND respectively; PIN2 and PIN3 are communication pins of AT89S52 and AT89C2051, in which the later receives data from the former, gives response and displays relevant information on the Chinese LCD; CE20 and R20 form a reset circuit which resets AT89C2051 during power supplying; X2, C21 and C22 form a oscillation circuit that provides AT89C2051 with time base; A is a teaching button and B is a buzzer.

The detailed method step or procedure flow of this embodiment is given as follows:

In the reference FIGS. 6-9, when starting, the program is initialized first to read data from EEPROM and makes process in following procedures:

1. In the step 10, judging whether an instruction for transmitting records has been received from communication interfaces P3.0, P3.1 of the connector JP4, if yes, reading records including time, tire turns, alarm signals, fault tire locations, fault times and correction condition from the EEPROM, and transmitting them to outside equipment (not shown) connected to the communication interfaces P3.0, P3.1 to use as a backup;

2. In the step 20, displaying the version in use on a display screen LCD;

3. In the step 30, reading the data including statuses (normal, teaching, alarm), fault tire locations, fault times and correction condition in the EEPROM;

4. In the step 40, reading current time from the real-time clock circuit DICED and recording it together with the booting and resetting statuses in the EEPROM; 5. In the step 50, judging whether the teaching mark is '1', and if yes, performing the process for establishing the reference value, or else turning to step 200;

6. In the step 60, displaying 'be teaching . . . ';

7. In the step 70, initializing the data;

8. In the step 80, reading pulses of four individual tires from the tire signal interface circuit, and counting respectively;

9. In the step 90, judging whether count of obtained pulses reaches a preset value, and if not, turning to step 220;

10. In the step 100, calculating rotation speeds of individual tires;

11. In the step 110, judging whether the teaching mark is '1', and if not, turning to the step 300;

12. In the step 120, judging whether the rotation speeds meet following requirement: 5.56 m/s<rotation speed× $2\pi R$<22.22 m/s: and if not, turning to the step 800;

13. In the step 130, establishing the reference data according to the method for establishing reference data;

14. In the step 140, writing the rotation reference value in the EEPROM;

15. In the step 150, setting the teaching mark into '0', and displaying 'operation normal' on the LCD display screen; 16. Turning to the step 800 from the step 150;

17. In the step 200, judging whether the alarm mark is '1', and if not, turning to the step 70;

18. In the step 210, displaying 'alarming . . . ' on the display screen LCD and displaying the location of fault tire, and turning to the step 70;

19. In the step 220, reading data from the key interface circuit and judging whether the teaching key K is pressed down, and if not, turning to the step 240;

20. In the step 230, displaying 'be teaching . . . ', and accumulating rotating turns and time, then setting the teaching mark to '1'and turning to the step 80;

21. In the step 240, reading data from the braking interface circuit and judging whether there is braking, and if not, turning to the step 80;

22. In the step 250, displaying 'be braking' on the display screen LCD, and subtracting the accumulated rotating turns and braking time;

23. In the step 260, recovering the status of the display screen before braking, and turning to the step 70;

24. In the step 300, judging whether the rotation speeds meet following requirement: 5.56 m/s <rotation speed× $2\pi R$<55.56 m/s;and if not, turning to the step 800;

25. In the step 310, judging the alarm mark is '1', and if yes, turning to the step 375;

26. In the step 320, reading the value n of the DIPIO from the data setting circuit, and judging whether the measured and calculated rotation speeds meet the following requirement: |measured and calculated rotation speed Vc− reference rotation speed Vd|<$2333\times10^{-6}$ turn/s+n×$1333\times10^{-7}$ turn/s, and if not, turning to the step 600; and if yes, turning to the step 500;

27. In the step 330, judging whether |Vclf−Vtlf| or |Vcrf−Vtrf| is less than $4666\times10^{-6}$ turn/s+n×$1333\times10^{-7}$ turn/s, and if not, turning to the step 600; and if yes, turning to the step 340;

28. In the step 340, judging whether |Vclf−Vtlf| or |Vcrf−Vtrf| is less than $4666\times10^{-6}$ turn/s+n×$1333\times10^{-7}$ turn/s, and if not, turning to the step 700; and if yes, turning to the step 350;

29. In the step 350, clearing all of left front counter, right front counter, left back counter and right back counter to 0;

30. Turning to the step 800 following the step 350;

31. In the step 500, calculating:

Left difference reference of rotation speed Vrld=Vtlf−Vtlb;

Right difference reference of rotation speed Vrrd=Vtrf−Vtrb;

Left difference of measured and calculated rotation speed Vcld=Vclf−Vclb;

Right difference of measured and calculated rotation speed Vcrd=Vcrf−Vcrb;

32. In the step 505, judging whether |Vrld−Vcld| is less than |Vrrd−Vcrd|, and if yes, then turning to the step 525; if not, turning to the step 510;

33. In the step 510, judging whether Vcld is more than Vrld, and if yes, turning to the step 515; if not, turning to the step 520;

34. In the step 515, left front counter=left front counter+1 (accumulating the times of abnormal data existing continuously, similarly hereinafter), and setting all of right front counter, left back counter and right back counter to 0, then turning to the step 540;

35. In the step 520, left back counter=left back counter+1, and setting all of left front counter, right front counter and right back counter to 0,then turning to the step 550;

36. In the step 525, judging whether Vcrd is more than Vrrd, and if yes, turning to the step 530; and if not, turning to the step 535;

37. In the step 530, right front counter=right front counter+1, and setting all of left front counter, left back counter and right back counter to 0, then turning to the step 560;

38. In the step 535, right back counter=right back counter+1, and setting all of left front counter, right front counter and left back counter to 0, then turning to the step 570;

39. In the step 540, judging whether left front counter is equal to 4 (accumulated times of abnormal data existing continuously reach the preset value, similarly hereinafter), and if yes, turning to the step 545; and if not, turning to the step 580;

40. In the step 545, setting the fault mark of the left front tire, then turning to the step 580:

41. In the step 550, judging whether left rear counter is equal to 4, and if yes, turning to the step 555; and if not, turning to the step 580;

42. In the step 555, setting the fault mark of the left rear tire, then turning to the step 580;

43. In the step 560, judging whether right front counter is equal to 4, and if yes, turning to the step 565; and if not, turning to the step 580;

44. In the step 565, setting the fault mark of the right front tire, then turning to the step 580;

45. In the step 570, judging whether right rear counter is equal to 4, and if yes, turning to the step 575; and if not, turning to the step 580;

46. In the step 575, setting the fault mark of the right rear tire, then turning to the step 580; 47. In the step 580, turning to the step 360;

48. In the step 600, left front counter=left front counter+1, right front counter=right front counter+1, and setting both of the left rear counter and the right rear counter to '0';

49. In the step 610, judging whether both the left front counter and right front counter are equal to 4, and if yes, turning to the step 620; and if not, turning to the step 680.

50. In the step 620, setting the fault marks of the left front tire and the right front tire, then turning to the step 680; 51. In the step 680, turning to the step 360;

52. In the step 700, left rear counter=left rear counter+1, right rear counter =right rear counter+1, and setting both of the left front counter and the right front counter to '0';

53. In the step 710, judging whether both the left rear counter and right rear counter are equal to 4, and if yes, turning to the step 720; and if not, turning to the step 780;

54. In the step 720, setting the fault marks of the left rear tire and the right rear tire, then turning to the step 780;

55. In the step 780, turning to the step 360;

56. In the step 360, judging whether a fault (namely, the fault mark of the left front tire, the left rear tire, the right front tire or right rear tire is set) is existed, and if yes, entering the step 365; and if not, turning to the step 800;

57. In the step 365, raising an alarm (providing the driving signal to the buzzer and its interface circuit), and setting the alarm mark to '1' (it is indicated that an alarm has been raised);

58. In the step 370, displaying the location of the fault tire (according to the fault marks of the left front tire, left rear tire, right front tire and the right rear tire, and transmitting information on locations of the fault tires to a display screen and interface circuit thereof), then turning to the step 800;

60. In the step 375, judging whether |Vd−Vc| is less than $3333 \times 10^{-7}$ turn/s, and if yes, turning to the step 380; and if not, turning to the step 800.

61. In the step 380, recovery counter=recovery counter+1;

62. In the step 385, judging whether the recovery counter is equal to 4, and if yes, turning to the step 390; and if not, turning to the step 800;

63. In the step 390, clearing the alarm mark to '0', and displaying 'operation normal' on the display screen LCD, then turning to the step 395;

64. In the step 395, clearing the recovery counter to '0';

65. In the step 800, writing time, rotation speeds and statuses (normal, teaching, alarm) of individual tires, fault tire locations, fault times and correction condition in the EEPROM, and turning to the step 910;

66. In the step 900, judging whether |Vd−Vc| is less than $4666 \times 10^{-6}$ turn/s $+n \times 1333 \times 10^{-7}$ turn/s, and if yes, turning to the step 580; and if not, turning to the step 910;

67. In the step 910, judging whether Vcld is more than Vrld, and if yes, turning to the step 915, and if not, turning to the step 920;

68. In the step 915, left front counter=left front counter+1, right rear counter=right rear counter+1, and setting both of the right front counter and the left rear counter to '0' then turning to the step 940;

69. In the step 940, judging whether both the left front counter and right rear counter are equal to 4, and if yes, turning to the step 945; and if not, turning to the step 580;

70. In the step 945, setting the fault marks of the left front tire and the right rear tire, then turning to the step 580;

71. In the step 920, right front counter=right front counter+1, left rear counter=left rear counter+1, and setting both of the left front counter and the right rear counter to '0', then turning to the step 950;

72. In the step 950, judging whether both the right front counter and left rear counter are equal to 4, and if yes, turning to the step 955; and if not, turning to the step 580;

73. In the step 955, setting the fault marks of the right front tire and the left rear tire, then turning to the step 580.

Thus, some detailed embodiments according to the method and system of the invention have been described. And reference will be made to the patent application Ser. No. CN1623809A for the matter not illuminated herein.

In addition to above advantages and effects, the present invention has following advantages:

1. The rotation speed reference value is obtained through reference data sampling and determining method, and its value is typical and meets actual conditions and requirements and thereby is of standard significance.

2. The compared result is conformed under such condition that the rotation speeds of a tire that are measured and calculated several times continuously are more than measured and calculated rotation speeds of other tire, and in such way that the impact of individual tires to each other can be avoided and the result is more accurate.

3. The preset value can be set by the switch through a data setting circuit, and there is simple variation in the system for different models of the vehicles, so that it is not necessary to change software.

In the context, in addition to meanings that are assigned directly, Vclf, Vcrf, Vclb, Vcrb, Vtlf, Vtrf, Vtlb, Vtrb have following meanings:

Vclf, Vcrf, Vclb and Vcrb represent the current measured rotation speeds of the left front tire, the right front tire, the left rear tire and the right rear tire, respectively; and Vtlf, Vtrf, Vtlb and Vtrb represent the teaching values of the measured rotation speeds of the left front tire, the right front tire, the left rear tire and the right rear tire, respectively.

Although having described and illustrated a preferred embodiment of the present invention, it is understood by those skill in the art that the preferred embodiment of the present invention can be modified in arrangement and detail without departing from the principle and spirit of the present invention. We therefore claim all modifications and variations coming within the scope of the following claims and its equivalence.

What is claimed is:

1. A method for monitoring tire pressure variation of automobile tire, comprising steps of:
   (1) obtaining rotation speeds of individual automobile tires, and creating rotation speed reference values Vr for comparison and judgment based on the obtained rotation speeds;
   (2) obtaining and calculating current rotation speeds of individual automobile tires, and calculating:
   reference rotation speed difference Vd=|(Vtlf−Vtrf)−(Vtlb−Vtrb)|;
   measured and calculated rotation speed difference Vc=|(Vclf−Vcrf)−(Vclb−Vcrb)|; and,
   regarding Vres=|Vd−Vc| as the compared result;
   wherein, Vtlf, Vtrf, Vtlb and Vtrb represent the teaching values of the measured rotation speeds of the left front tire, the right front tire, the left rear tire and the right rear tire, respectively, and Vclf, Vcrf, Vclb and Vcrb represent the current measured rotation speeds of the left front tire, the right front tire, the left rear tire and the right rear tire, respectively;
   (3) judging the compared result Vres and raising alarms if the compared result Vres exceeds a preset value; or else, turning to step (2).

2. The monitoring method according to claim 1, wherein the compared result Vres in the step (3) is confirmed and considered to raise an alarm only when it exceeds the preset value continuously many times.

3. The monitoring method according to claim 1, wherein for the rotation speeds mentioned in steps (1) and (2), a braking case or turns of tire measured during braking and a spent time must be excluded.

4. The monitoring method according to claim 3, wherein in the step (1), the rotation reference speeds of individual tires are established based on a method for establishing reference data.

5. The monitoring method according to claim 3, wherein the following data will be calculated if an alarm is raised in step (3):
   left difference reference of rotation speed Vrld=Vtlf−Vtlb;
   right difference reference of rotation speed Vrrd=Vtrf−Vtrb;
   left difference of measured and calculated rotation speed Vcld=Vclf−Vclb;
   right difference of measured and calculated rotation speed Vcrd=Vcrf−Vcrb; and;
   comparing |Vrld−Vcld| with |Vrrd−Vcrd|:
      if |Vrld−Vcld|>|Vrrd−Vcrd|, then further comparing Vclf with Vclb;
         if Vclf>Vclb, it is indicated that a fault occurs in the left front tire;
         if Vclf<Vclb, it is indicated that a fault occurs in the left rear tire;
      if |Vrld−Vcld|<|Vrrd−Vcrd |, then further comparing Vcrf with Vcrb;
         if Vcrf>Vcrb, it is indicated that a fault occurs in the right front tire;
         if Vcrf<Vcrb, it is indicated that a fault occurs in the right rear tire.

6. The monitoring method according to claim 3, wherein the following data will be calculated in calculating step (4) if an alarm is raised in step (3):
   left difference reference of rotation speed Vrld=Vtlf−Vtlb;
   right difference reference of rotation speed Vrrd=Vtrf−Vtrb;
   left difference of measured and calculated rotation speed Vcld=Vclf−Vclb;
   right difference of measured and calculated rotation speed Vcrd=Vcrf−Vcrb; and;
   comparing |Vrld−Vcld| with |Vrrd−Vcrd|, wherein:
   if |Vrld−Vcld|>|Vrrd−Vcrd|, then further judging whether Vcld >Vrld is true, and if true, it is indicated that a fault occurs in the left front tire; or else, it is indicated that a fault occurs in the left rear tire;
   if |Vrld−Vcld|<|Vrrd−Vcrd|, then further judging whether Vcrd>Vrrd is true, if true, it is indicated that a fault occurs in the right front tire; or else, it is indicated that a fault occurs in the right rear tire.

7. The monitoring method according to claim 6, wherein, in the calculating step (4), if |Vrld−Vcld|=|Vrrd−Vcrd|, then further judging whether Vres>preset value×2 is true;
   if true, further comparing and judging whether Vrld<Vcld is true, if true, it is indicated that faults occur in the left front tire and the right rear tire; or else, it is indicated that faults occur in the right front tire and the left rear tire.

8. The monitoring method according to claim 7, wherein the following comparison and determination will be performed if Vres>preset value×2 is false:
   if both |Vclf−Vtlf|>preset value×2 and |Vcrf−Vtrf|>preset value×2 are true, then it is indicated that faults occur in the left front tire and the right front tire;
   if both |Vclb−Vtlb|>preset value×2 and |Vcrb−Vtrb|>preset value×2 are true, it is indicated that faults occur in the left rear tire and the right rear tire.

9. The monitoring method according to claim 6, wherein the method turns to step (2) while indicating the faults, and records the rotation speeds of individual tires with respect to time, and when tire faults occur, alarm signal, tire location, times of faults, and correction condition are further recorded.

10. A system for monitoring tire pressure variation of automobile tire, comprising:
   a tire signal interface circuit for obtaining rotation signal of tires of a vehicle and converting the same;
   a braking signal converting circuit for obtaining braking signal of the vehicle and converting the same;
   a key-press input circuit;
   a single chip microprocessor, which performs processing in accordance with signals provided by the tire signal interface circuit, the braking signal convening circuit and the key-press input circuit;
   a display screen interface circuit or a buzzer driving circuit, which sends concerned information to the display screen or the buzzer based on processing results of the single chip microprocessor,
   wherein the single chip microprocessor performs processing in accordance with flowing procedures:
   (1) obtaining rotation speeds of individual automobile tires, and creating rotation speed reference values Vr for comparison and judgment based on the obtained rotation speeds;
   (2) obtaining and calculating current rotation speeds of individual automobile tires, and calculating:
   reference rotation speed difference Vd=|(Vtlf−Vtrf)−(Vtlb−Vtrb)|;
   measured and calculated rotation speed difference Vc=|(Vclf−Vcrf)−(Vclb−Vcrb)|; and,
   regarding Vres=|Vd−Vc| as the compared result;
   wherein, Vtlf, Vtrf, Vtlb and Vtrb represent the teaching values of the measured rotation speeds of the left front tire, the right front tire, the left rear tire and the right rear tire, respectively, and Vclf, Vcrf, Vclb and Vcrb represent the current measured rotation speeds of the left front tire, the right front tire, the left rear tire and the right rear tire, respectively;

(3) judging the compared result Vres and raising alarms if the compared result Vres exceeds a preset value; or else, turning to step (2).

11. The monitoring system according to claim 10, wherein the compared result Vres in the step (3) is confirmed and considered to raise an alarm only when it exceeds the preset value continuously many times.

12. The monitoring system according to claim 10, wherein for the rotation speeds mentioned in steps (1) and (2), a braking case or turns of tire measured during braking and a spent time must be excluded.

13. The monitoring system according to claim 12, wherein the system is further provided with a data setting circuit.

14. The monitoring system according to claim 10, wherein in the step (1), the rotation reference speeds of individual tires are established based on a method for establishing a reference data.

15. The monitoring system according to claim 13, wherein the following data will be calculated if an alarm is raised in step (3):

left difference reference of rotation speed Vrld=Vtlf−Vtlb;
right difference reference of rotation speed Vrrd=Vtrf−Vtrb;
left difference of measured and calculated rotation speed Vcld=Vclf−Vclb;
right difference of measured and calculated rotation speed Vcrd=Vcrf−Vcrb; and;
comparing |Vrld−Vcld| with |Vrrd−Vcrd|:
  if |Vrld−Vcld|>|Vrrd−Vcrd|, then further comparing Vclf with Vclb;
    if Vclf>Vclb, then transmitting a signal indicating that a fault occurs in the left front tire to the display screen and the display screen interface circuit thereof;
    if Vclf<Vclb, then transmitting a signal indicating that a fault occurs in the left rear tire to the display screen and the display screen interface circuit thereof;
  if |Vrld−Vcld|<|Vrrd−Vcrd|, then further comparing Vcrf with Vcrb;
    if Vcrf>Vcrb, then transmitting a signal indicating that a fault occurs in the right front tire to the display screen and the display screen interface circuit;
    if Vcrf<Vcrb, then transmitting a signal indicating that a fault occurs in the right rear tire to the display screen and the display screen interface circuit thereof.

16. The monitoring system according to claim 13, wherein the following data will be calculated in calculating step (4) if an alarm is raised in step (3):

left difference reference of rotation speed Vrld=Vtlf−Vtlb;
right difference reference of rotation speed Vrrd=Vtrf−Vtrb;
left difference of measured and calculated rotation speed Vcld=Vclf−Vclb;
right difference of measured and calculated rotation speed Vcrd=Vcrf−Vcrb; and;
comparing |Vrld−Vcld| with |Vrrd−Vcrd|, wherein:
  if |Vrld−Vcld|>|Vrrd−Vcrd|, then further judging whether Vcld >Vrld is true, and if true, then transmitting a signal indicating that a fault occurs in the left front tire to the display screen and the display screen interface circuit thereof; or else, transmitting a signal indicating that a fault occurs in the left rear tire to the display screen and the display screen interface circuit thereof;
  if |Vrld−Vcld|<|Vrrd−Vcrd|, then further judging whether Vcrd>Vrrd is true, and if true, then transmitting a signal indicating that a fault occurs in the right front tire to the display screen and the display screen interface circuit thereof; or else, transmitting a signal indicating that a fault occurs in the right rear tire to the display screen and the display screen interface circuit thereof.

17. The monitoring system according to claim 16, wherein in the calculating step (4) of said monitoring system, if |Vrld−Vcld|=|Vrrd−Vcrd|, then further judging whether Vres>preset value×2 is true;
  if true, then further comparing and judging whether Vrld<Vcld is true, and if true, then transmitting a signal indicating that faults occur in the left front tire and the right rear tire to the display screen and the display screen interface circuit thereof; or else, transmitting a signal indicating that faults occur in the right front tire and the left rear tire to the display screen and the display screen interface circuit thereof.

18. The monitoring system according to claim 17, wherein the following comparison and determination will be performed if Vres>preset value×2 is false:
  if both |Vclf−Vtlf|>preset value×2 and |Vcrf−Vtrf|>preset value×2 are true, then transmitting a signal indicating that faults occur in the left front tire and the right front tire to the display screen and the display screen interface circuit thereof;
  if both |Vclb−Vtlb|>preset value×2 and |Vcrb−Vtrb|>preset value×2 are true, then transmitting a signal indicating that faults occur in the left rear tire and the right rear tire to the display screen and the display screen interface circuit thereof.

19. The monitoring system according to claim 16, wherein the monitoring system turns to step (2) while indicating faults and records the rotation speeds of individual tires with respect to time, and when tire faults occur, alarm signal, tire locations, times of faults, and correction condition are further recorded.

* * * * *

UNITED STATES PATENT AND TRADEMARK OFFICE
CERTIFICATE OF CORRECTION

| | |
|---|---|
| PATENT NO. | : 7,395,177 B2 |
| APPLICATION NO. | : 11/396767 |
| DATED | : July 1, 2008 |
| INVENTOR(S) | : Haosheng Chen et al. |

It is certified that error appears in the above-identified patent and that said Letters Patent is hereby corrected as shown below:

Col. 12, line 18, change "$4666 \times 10^{-5}$ to --$4666 \times 10^{-6}$--.

Signed and Sealed this

Twenty-eighth Day of July, 2009

JOHN DOLL
*Acting Director of the United States Patent and Trademark Office*